(12) United States Patent
Chang et al.

(10) Patent No.: US 9,771,450 B2
(45) Date of Patent: Sep. 26, 2017

(54) EPOXY COMPOSITION

(71) Applicant: Dow Global Technologies LLC, Midland, MI (US)

(72) Inventors: Kwanho Chang, Freeport, TX (US); Jia Xie, Freeport, TX (US); Shouren Ge, Freeport, TX (US); Nathan Wilmot, Freeport, TX (US); Rajat Duggal, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/652,295

(22) PCT Filed: Dec. 13, 2013

(86) PCT No.: PCT/US2013/075037
§ 371 (c)(1),
(2) Date: Jun. 15, 2015

(87) PCT Pub. No.: WO2014/099666
PCT Pub. Date: Jun. 26, 2014

(65) Prior Publication Data
US 2015/0307651 A1 Oct. 29, 2015

Related U.S. Application Data

(60) Provisional application No. 61/740,138, filed on Dec. 20, 2012.

(51) Int. Cl.
| | |
|---|---|
| *C08G 59/68* | (2006.01) |
| *C08G 59/64* | (2006.01) |
| *C08G 59/50* | (2006.01) |
| *C08G 59/06* | (2006.01) |
| *C08K 5/56* | (2006.01) |
| *C08K 5/098* | (2006.01) |

(52) U.S. Cl.
CPC ....... *C08G 59/5006* (2013.01); *C08G 59/066* (2013.01); *C08G 59/64* (2013.01); *C08G 59/682* (2013.01); *C08G 59/685* (2013.01); *C08K 5/56* (2013.01); *C08K 5/098* (2013.01)

(58) Field of Classification Search
None
See application file for complete search history.

(56) References Cited

U.S. PATENT DOCUMENTS

| | | | |
|---|---|---|---|
| 4,117,361 A * | 9/1978 | Smith | C08G 59/226 156/53 |
| 5,369,150 A | 11/1994 | Fujibayashi et al. | |
| 2003/0194562 A1* | 10/2003 | Ishii | C08F 283/08 428/413 |
| 2009/0068473 A1 | 3/2009 | Van Wessel et al. | |
| 2013/0161080 A1* | 6/2013 | Lin | B32B 15/092 174/257 |

FOREIGN PATENT DOCUMENTS

| | | |
|---|---|---|
| CN | 101305063 | 11/2008 |
| GB | 1194086 A | 6/1970 |
| WO | 2012030338 A1 | 3/2012 |

OTHER PUBLICATIONS

Yamanaka, et al., "Phase separation mechanism of rubber-modified epoxy", Journal of Materials Science, issue 1, vol. 25, Jan. 1990, pp. 241-245.
Chen, et al., "Phase Separation Process in Poly(ε-caprolactone)-Epoxy Blends", Macromolecules, issue 16, vol. 32, Aug. 1999, pp. 5348-5356.
Mondragon, et al. "Micro- or nanoseparated phases in thermoset blends of an epoxy resin and PEO-PPO-PEI triblock copolymer", Polymer, vol. 46, issue 18, Aug. 2005, pp. 7082-7093.

* cited by examiner

*Primary Examiner* — David Buttner
(74) *Attorney, Agent, or Firm* — Brooks, Cameron & Huebsch, PLLC

(57) ABSTRACT

An epoxy composition that includes an epoxy-terminated prepolymer, an alkanolamine hardener having at least one hydroxyl group and an organometallic compound, where amine groups of the alkanolamine hardener react with epoxy groups of the epoxy-terminated prepolymer in a stoichiometric ratio to form a cured epoxy composition. The epoxy-terminated prepolymer is formed from a reaction product of an amine terminated polymeric polyol and a molar excess of epoxy groups in an epoxy monomer, relative to a molar amount of amine groups in the amine terminated polymeric polyol.

9 Claims, 3 Drawing Sheets

EPOXY COMPOSITION

This application is a National Stage Application under 35 U.S.C. §371 of International Application Number PCT/US2013/075037, filed Dec. 13, 2013 and published as WO 2014/099666 on Sep. 25, 2014, which claims the benefit to U.S. Provisional Application 61/740,138, filed Dec. 20, 2012, the entire contents of which are incorporated herein by reference in its entirety.

FIELD OF DISCLOSURE

The present disclosure relates generally to an epoxy composition, and more particularly to an epoxy composition having improved mechanical properties.

BACKGROUND

Epoxy compositions are formed, at a minimum, from an epoxy resin and a hardener. The epoxy resin can include one or more epoxide groups, while the hardener can include a variety of structures that react with the epoxide group. These two components chemically react, or "cure," to form a cured epoxy product. Upon curing the epoxy composition forms a highly cross-linked thermoset.

Cured epoxy compositions can have a variety of properties. These properties can depend upon the choice of epoxy resin, hardener, ratio of components, reaction conditions and additives, if any, present in the epoxy composition. For certain applications, the choice of these components can help to achieve the desired result. Control over the morphology of the cured epoxy composition may also help in achieving these desired results. How to accomplish control over the morphology of the cured epoxy composition, however, is an area ripe for investigation.

SUMMARY

The present disclosure provides for an epoxy composition that includes an epoxy-terminated prepolymer, an alkanolamine hardener having at least one hydroxyl group and 1.0 to 10 weight percent (wt. %) of an organometallic compound relative the total weight of the epoxy composition. The epoxy-terminated prepolymer is formed from a reaction product of an amine terminated polymeric polyol and a molar excess of epoxy groups from an epoxy monomer, relative to a molar amount of amine groups from the amine terminated polymeric polyol. The amine groups of the alkanolamine hardener react with epoxy groups of the epoxy-terminated prepolymer in a stoichiometric ratio to form a cured epoxy composition. For the various embodiments, the organometallic compound is selected from the group consisting of zinc octoate, bismuth neodecanoate, titanium(IV) 2-ethylhexyloxide, and a combination thereof.

Depending upon the reaction temperature, the epoxy composition can have hard segments in the soft matrix, where the hard segments are in at least one of a micrometer scale domain, a nanometer scale domain or a combination thereof. The soft matrix can be formed with the epoxy-terminated prepolymer and hard segments can be formed from the alkanolamine hardener and the excess epoxy monomer in the epoxy-terminated prepolymer. The phase separated morphology can provide the cured epoxy composition with two or more glass transition temperatures. Specifically, the hard segments formed from the alkanolamine hardener and the excess epoxy monomer in the epoxy-terminated prepolymer have a glass transition temperature (Tg) that is greater than the Tg of the soft matrix formed with the epoxy-terminated prepolymer. The nanometer scale domains of the hard particles can also help to provide the epoxy composition with improved tensile and mechanical properties.

The present disclosure also provides for a method of forming a cured epoxy composition. The method includes admixing the epoxy-terminated prepolymer, the alkanolamine hardener, and 1.0 to 10 wt. % of an organometallic compound relative the total weight of the cured epoxy composition to form an epoxy composition. The epoxy-terminated prepolymer can be formed from a reaction product of the amine terminated polymeric polyol and a molar excess of epoxy groups in the epoxy monomer, relative to a molar amount of amine groups from the amine terminated polymeric polyol. The amine groups of the alkanolamine hardener react with epoxy groups of the epoxy-terminated prepolymer in a stoichiometric ratio in the epoxy composition to form the cured epoxy composition.

Reacting the epoxy-terminated prepolymer with the alkanolamine hardener and the organometallic compound can include forming nanometer scale domains of hard segments formed with the alkanolamine hardener and the epoxy monomer in the soft matrix, relative the hard segments, formed with a backbone of the epoxy-terminated prepolymer.

Embodiments of the present disclosure further include controlling a type and an amount of the organometallic compound in the epoxy composition to induce a morphological transition from micrometer scale domains to nanometer scale domains of hard segments formed with the alkanolamine hardener and the epoxy monomer in the soft matrix, relative the hard segments, formed with a backbone of the epoxy-terminated prepolymer. A total amount of epoxy monomer in the epoxy composition can be controlled to induce a morphological transition from micrometer scale domains to nanometer scale domains of the hard segments formed with the alkanolamine hardener and the epoxy monomer in a soft matrix, relative the hard segments, formed with a backbone of the epoxy-terminated prepolymer.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1A:
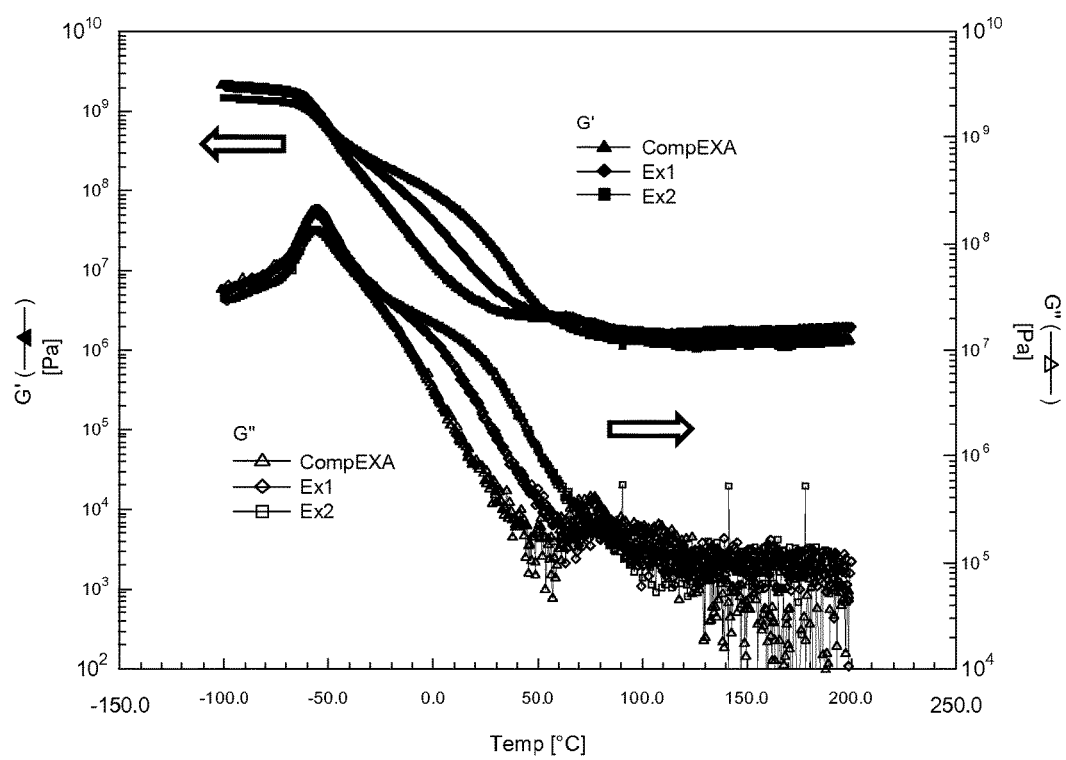
FIGS. 1A and 1B provide DMA data for epoxy compositions cured with MEA at different loading of zinc octoate.

Embodiments of the present disclosure provide an epoxy composition that allows for control of a morphology (e.g., shape, size, and phase distribution) of hard segments in a soft matrix prepared with an alkanolamine hardener, an epoxy-terminated prepolymer and an organometallic compound. Specifically, the cure condition (e.g., temperature, among others) for the epoxy composition helps to control the size of the hard segments (formed with the alkanolamine hardener) in the soft matrix (formed with a backbone of the epoxy-terminated prepolymer and "soft" relative the hard segments) in a cured epoxy composition, where the hard segments can be in the nanometer scale (e.g., 1 to 100 nanometer). This reduction in the size of the hard segments allows the optical clarity and mechanical and adhesion performance of the cured epoxy composition to be significantly improved relative to the production of the hard segments in the micrometer scale (e.g., 1 to 100 micrometer).

The control over the morphology allows for the cured epoxy composition to have an optical clarity, mechanical performance and adhesion performance that are highly suitable for a number of different applications, such as coating of pipes. Among other things, it has been discovered that when the hard segments are molecularly dispersed in the soft matrix as nanometer scale domains there is a large contact area of epoxy molecules to an underlying substrate, as compared to the case where they are dispersed as micrometer scale domains (e.g., in the micrometer scale; 1 to 100 micrometer). As a result, not only can an optical clarity be achieved in the cured epoxy composition of the present disclosure, but also improvements in tensile and adhesion properties of the cured epoxy coating. Examples in the present disclosure put emphases on the effect of the organometallic compounds on the morphology of the cured epoxy composition formed from the epoxy composition discussed herein.

As provided herein, the epoxy composition of the present disclosure includes an epoxy-terminated prepolymer, an alkanolamine hardener and an organometallic compound. The epoxy-terminated prepolymer can be formed from a reaction product of an amine terminated polymeric polyol and a molar excess of epoxy groups from an epoxy monomer, relative to a molar amount of amine groups from the amine terminated polymeric polyol. The amine groups of the alkanolamine hardener react with epoxy groups of the epoxy-terminated prepolymer in a stoichiometric ratio (e.g., a 1:1 stoichiometric ratio of amine groups to epoxy groups to form the cured epoxy composition of the present disclosure). The stoichiometric ratio of the amine groups of the alkanolamine hardener to the epoxy groups of the epoxy-terminated prepolymer can also vary from 1.25:1 to 1:1.25 to form the cured epoxy composition of the present disclosure.

The epoxy-terminated prepolymer of the present disclosure includes the reaction product of an amine terminated polymeric polyol and a molar excess of epoxy groups from an epoxy monomer, relative to a molar amount of amine groups from the amine terminated polymeric polyol. The amine terminated polymeric polyol can be selected from the group consisting of a primary amine terminated polyether polyol, a secondary amine terminated polyether polyol, and combinations thereof. The amine terminated polymeric polyol can also be a primary amine terminated polyether polyol or a secondary amine terminated polyether polyol. The amine terminated polymeric polyol can be an amine terminated polyester polyol, an amine terminated butadiene acrylonitrile (ATBN) or a combination thereof.

Preferably, the amine terminated polymeric polyol includes primary amine functional groups. The amine terminated polymeric polyol includes from 2 to 6 amine functional groups. In one embodiment, the amine terminated polymeric polyol includes 3 amine functional groups. The amine terminated polymeric polyol used in the epoxy-terminated prepolymer also has an amine equivalent weight ("AEW" which is the molecular weight of amine divided by the number of active hydrogens in the molecule) that is low enough to allow for a homogenous reaction mixture to be formed during an early stage of the reaction, but that is also high enough to induce a phase separation of the polymeric polyol in a later stage of the reaction that forms the epoxy-terminated prepolymer.

For the various embodiments, the amine terminated polymeric polyol has an AEW of at least 500 grams/mole (g/mol). More specifically, values for the AEW include those from 500 g/mol to 6000 g/mol. All individual values and subranges from 500 g/mol to 6000 g/mol are included; for example, the AEW can be from a lower limit of 500 g/mol, 1000 g/mol or 1500 g/mol to an upper limit of 2000 g/mol, 4000 g/mol, 5000 g/mol or 6000 g/mol. Specific examples include a Mn of the amine terminated polymeric polyol from 500 g/mol to 2000 g/mol; from 500 g/mol to 4000 g/mol; from 500 g/mol to 5000 g/mol; from 1000 g/mol to 2000 g/mol; from 1000 g/mol to 4000 g/mol; from 1000 g/mol to 5000 g/mol; from 1000 g/mol to 6000 g/mol; from 1500 g/mol to 2000 g/mol; from 1500 g/mol to 4000 g/mol; from 1500 g/mol to 5000 g/mol; and from 1500 g/mol to 6000 g/mol. The AEW can be determined in accordance with ISO 9702.

Examples of primary and/or secondary amine terminated polyether polyols can include those having a polyether backbone formed from the group consisting of ethylene oxide, propylene oxide, butylene oxide, tetramethylene ether glycol and combinations thereof. Amination of the polyether polyol can occur in a number of ways including reaction with ammonia or another amine by way of a reductive alkylation or reductive amination.

The use of commercially available primary amine terminated polyether polyols and/or commercially available secondary amine terminated polyether polyols is also possible. Examples of primary amine terminated polyether polyols that are commercially available include, but are not limited to, those sold under the trade designator JEFFAMINE® T5000, JEFFAMINE® T3000, JEFFAMINE® D4000, JEFFAMINE® D2000 from Huntsman, Versalink® P-1000 from Air Products, and combinations thereof. Examples of secondary amine terminated polyether polyols that are commercially available include, but are not limited to, those sold under the trade designator JEFFAMINE® SD2001, JEFFAMINE® ST-404 and combinations thereof.

Examples of the amine terminated polyester polyol include, but are not limited to, those having a polyester backbone formed from the reaction of aliphatic or aromatic diacids including adipic acid, glutaric acid, succinic acid, azelaic acid, caprolactone, phthalic anhydride and terephthalic acid with glycols including 1,4-butanediol, diethylene glycol, ethylene glycol, 1,6-hexanediol, neopentyl glycol, propylene glycol, trimethylolproprane, pentaerythritol and polytetramethylene ether glycol. Amination of the polyester polyol can occur in a number of ways including reaction of diacids with excess amine.

The epoxy monomer of the present disclosure can include aromatic epoxy monomers, among others. The epoxy monomer of the present disclosure can also include aliphatic epoxy monomers, among others. Examples of the epoxy monomer include, but are not limited to, bisphenol A type epoxy monomers such as D.E.R. 383 (The Dow Chemical Company), and epoxy novolac monomers such as D.E.N. 438 (The Dow Chemical Company). Examples of other suitable epoxy monomers include, but are not limited to, those sold under the trade designator D.E.R.™ 330, D.E.R.™ 331, D.E.R.™ 332, D.E.R.™ 324, D.E.R.™ 352, D.E.R.™ 354, D.E.R.™ 542, D.E.R.™ 560, D.E.N.™ 431, D.E.R.™ 736, D.E.R.™ 732, or combinations thereof available from The Dow Chemical Company.

Examples of aromatic epoxy monomers include, but are not limited to, divinylarene dioxide, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl) methane), 1,1,2,2-tetra(4-hydroxyphenyl)ethane, tetrabromobisphenol A, 2,2-bis(4-hydroxyphenyl)-1,1,1,3,3,3-hexafluoropropane, and 1,6-dihydroxynaphthalene.

Examples of aliphatic epoxies include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols such as propylene glycol, trimethylol propane, and glycerin; and diglycidyl esters of aliphatic long-chain dibasic acids.

The alkanolamine hardener of the present disclosure can include those alkanolamine hardeners that have at least one hydroxyl group. The alkanolamine hardener can also include those having a secondary hydroxyl group, and combinations of a primary hydroxyl group and a secondary hydroxyl group. The presence of at least one hydroxyl group is needed. Examples of such alkanolamine hardeners include, but are not limited to, monoethanolamine, 1-amino-2-propanol, 2-amino-1-propanol, 1-amino-3-propanol, 3-dimethylamino-1-propanol, 2-Amino-2-methyl-1-propanol, 1-amino-2-butanol, 4-amino-1-butanol, 2-amino-1-butanol, 3-aminobutan-1-ol, 5-Amino-1-pentanol, 2-Amino-1-pentanol, 5-Amino-1-pentanol, 3-aminopropane-1,2-dial and combinations thereof The epoxy composition of the present disclosure also includes an organometallic compound. It is believed that the organometallic compound can help to preferentially form the hard segments in the nanometer scale domain versus in the micrometer scale domain. The organometallic compound can be selected from the group consisting of zinc octoate, bismuth neodecanoate, and titanium(IV) 2-ethylhexyloxide and combinations thereof. Preferably, the organometallic compound used with the present disclosure is in a liquid state at room temperature (23° C.). Preferably, 1.0 to 10 weight percent (wt. %) of the organometallic compound can be used with the epoxy composition, were the weight percent is based on the total weight of the epoxy composition. More preferably, 1.84 to 8.57 wt. % of the organometallic compound can be used with the epoxy composition, were the weight percent is based on the total weight of the epoxy composition.

The epoxy-terminated prepolymer reaction product can be formed using a molar ratio of the epoxy groups from an epoxy monomer to the molar amount of amine groups from the amine terminated polymeric polyol of at least 4:1. The epoxy-terminated prepolymer reaction product can be formed using a molar ratio of the epoxy groups from an epoxy monomer to the molar amount of amine groups from the amine terminated polymeric polyol in a range of from 4:1 to 10:1. All individual values and subranges of the molar ratio from 4:1 to 10:1 are included; for example, the molar ratio of the epoxy groups from an epoxy monomer to the molar amount of amine groups from the amine terminated polymeric polyol can be from a lower limit of 4:1, 5:1, or 6:1 to an upper limit of 8:1, 9:1 or 10:1.

The epoxy-terminated prepolymer is formed as the reaction product of the amine terminated polymeric polyol and a molar excess of epoxy groups from an epoxy monomer, relative to a molar amount of amine groups from the amine terminated polymeric polyol. For a given molar ratio, a predetermined amount of the epoxy monomer can be charged into a reactor. The reactor environment can be purged with an inert gas (e.g., nitrogen) to provide an inert environment. The epoxy monomer can be heated to a temperature of at least 80° C. up to 150° C. For example the epoxy monomer can be heated to a temperature in a range from temperature 110° C. to 115° C. The pressure for the reaction can be atmospheric pressure.

The amine terminated polymeric polyol can be added and mixed with the epoxy monomer to form the reaction mixture. The organometallic compound is added and mixed with the epoxy monomer and the amine terminated polymeric polyol to form the reaction mixture.

The progress of the reaction can be monitored by testing the epoxy equivalent weight (EEW) of the reaction mixture, where the quantitative EEW can be calculated from the initial amount of epoxy monomer. Examples of suitable testing methods for EEW include ASTM D1652-04 among others. Preferably, in forming the epoxy-terminated prepolymer all (e.g., 100 percent) of the primary amines of the amine terminated polymeric polyol react with the epoxy groups of the epoxy monomer. In other words, the amine terminated polymeric polyol has no primary amines. In an alternative embodiment, at least 95 percent of the primary amines of the amine terminated polymeric polyol react with the epoxy groups of the epoxy monomer in forming the epoxy-terminated prepolymer of the present disclosure.

The epoxy-terminated prepolymer of the present disclosure can have a viscosity that is in a range from 1000 to 200000 centipoise (cP) at ambient temperature as measured using a TA Instruments AR2000 stress-controlled rheometer at a steady shear rate of 1 $s^{-1}$ by employing 50 mm parallel plates with 800 µm gap at 23° C. It is observed that the viscosity can decrease as the molar ratio of the epoxy monomer to the amine terminated polymeric polyol increases.

The epoxy-terminated prepolymer of the present disclosure is used to form the epoxy composition and the cured epoxy composition of the present disclosure. Specifically, the present disclosure includes forming the cured epoxy composition, as discussed herein, by admixing the epoxy-terminated prepolymer, formed as discussed herein, the alkanolamine hardener and 1.0 to 10 wt. % of an organometallic compound relative the total weight of the cured epoxy composition to form an epoxy composition, where amine groups of the alkanolamine hardener react with epoxy groups of the epoxy-terminated prepolymer in the stoichiometric ratio in the epoxy composition to form the cured epoxy composition.

It is also possible to control a type and an amount of the organometallic compound in the epoxy composite to induce a morphological transition between micrometer scale domain and nanometer scale domain separation of hard segments formed with the alkanolamine hardener and the epoxy monomer in the soft matrix, relative the hard segments, formed with a backbone of the epoxy-terminated prepolymer. It is also possible to control a total amount of epoxy monomer in the epoxy composite to induce the morphological transition between micrometer scale domain and nanometer scale domain separation of hard segments formed with the alkanolamine hardener and the epoxy monomer in the soft matrix, relative the hard segments, formed with a backbone of the epoxy-terminated prepolymer. As discussed herein, the epoxy composition of the present disclosure includes the organometallic compound in the curing of the epoxy composition of the present disclosure.

The cured epoxy composition can be formed using a stoichiometric ratio of the amine groups of the alkanolamine hardener to epoxy groups of the epoxy-terminated prepolymer in forming the epoxy composition. For example, the stoichiometric ratio can be a 1:1 molar ratio of the amine groups of the alkanolamine hardener to epoxy groups of the epoxy-terminated prepolymer in forming the epoxy composition. In addition, the stoichiometric ratio can be in a range from 1.25:1 to 1:1.25 for the molar ratio of the amine groups of the alkanolamine hardener to epoxy groups of the epoxy-terminated prepolymer in forming the epoxy composition. All individual values and subranges of the molar ratio from 1.25:1 to 1:1.25 are included; for example, the molar ratio of the amine groups of the alkanolamine hardener to epoxy groups of the epoxy-terminated prepolymer can be from a lower limit of 1.0, 1.1, or 1.2 to an upper limit of 1.2, 1.1, or 1.0.

The epoxy composition, as disclosed herein, can be cured to obtain the cured epoxy composition. The epoxy composition can be cured at a cure temperature greater than the Tg of the hard segments, typically in a range from 50° C. to 150° C. All individual values and subranges from 50° C. to 150° C. are included; for example, the cure temperature can be from a lower limit of 50° C., 60° C., or 70° C. to an upper limit of 130° C., 140° C. or 150° C. Specific examples include a cure temperature in a range from 50° C. to 140° C., 50° C. to 130° C., 60° C. to 150° C., 60° C. to 140° C., 60° C. to 130° C., 70° C. to 150° C., 70° C. to 140° C. and 70° C. to 130° C.

It is also possible to cure the epoxy composition in a step wise process, where the cure temperature changes (e.g., increases) during the course of the curing process. For example, the epoxy composition can be cured using a curing temperature that starts initially at 100° C., then after a predetermined time increases to 150° C., then after a second predetermined time increases to 200° C. A final cure temperature in the step process used in forming the epoxy composition can depend upon the Tg of the hard segments in the epoxy composition. For example, the final cure temperature can be at or just above the Tg value of hard segments of the epoxy composition. In an additional embodiment, the final cure temperature can be at least equal to the Tg of the hard segments of the epoxy composition. Completion of the curing step can be confirmed with differential scanning calorimetry (DSC) measurements.

For one or more embodiments, the epoxy compositions may include an additive. Examples of additives include, but are not limited to, nonreactive and reactive diluents; catalysts; fibers; fillers; aggregates; pigments; viscosity reducing agents; dyes; coloring agents; thixotropic agents; photo initiators; latent photo initiators, latent catalysts; inhibitors; flow modifiers; accelerators; surfactants; adhesion promoters; fluidity control agents; stabilizers; ion scavengers; UV stabilizers; fire retardants; toughening agents; wetting agents; mold release agents; coupling agents; tackifying agents, and combinations thereof. For various applications differing amounts of the additive can be employed.

EXAMPLES

In the Examples, various terms and designations for materials were used including, for example, the following:

2-aminoethanol (MEA, an alkanolamine hardener, available from Sigma-Aldrich);

JEFFAMINE® T-5000 (an amine terminated polymeric polyol, available from Huntsman International LLC);

2,2-Bis[4-(glycidyloxy)phenyl]propane, 4,4'-Isopropylidenediphenol diglycidyl ether (D.E.R. 383, epoxy monomer, available from the Dow Chemical Company); and Zinc octoate (available from Sigma-Aldrich).

Bismuth Neodecanoate (available from Sigma-Aldrich).

Titanium(IV) 2-ethylhexyloxide (available from Sigma-Aldrich).

Aluminum Acetoacetate (available from Sigma-Aldrich).

Zinc Stearate (available from Sigma-Aldrich).

Zirconium Acetylacetonate (available from Sigma-Aldrich).

Tin(II) 2-ethylhexanoate (available from Sigma-Aldrich).

Cobalt (II) 2-ethylhexanoate 65% in mineral spirits (available from Sigma-Aldrich).

Test Methods

Atomic Force Microscopy (AFM)

For AFM analysis, polish each cured sample under cryogenic conditions using a Leica UCT/FCS microtome operated at −140° C. Cut thin sections (about 160 nm) from each sample and place on a mica surface for AFM analysis. Topography and phase images were captured at ambient temperature (23° C.) using a Digital Instruments (now Bruker) Multi-Mode AFM system with a Mikromasch probe. The probe has a spring constant of 40 N/m and a resonant frequency in the vicinity of 170 kHz. Use an imaging frequency of 0.5-2 Hz with a set point ratio of ~0.8.

Dynamic Mechanical Analysis (DMA)

For Dynamic Mechanical Analysis (DMA) use a TA Instruments ARES strain-controlled rheometer. Cut cured sample out into a rectangular strip with dimension of 16.965 mm×6.88 mm. Conduct dynamic temperature sweeps with 10% strain and 1 Hz frequency between −100 and 250° C. along a temperature ramp (3° C./min).

Microtensile Analysis

Measure mechanical properties such as tensile strength and elongation at break by pulling dog bone specimens of the cured sample at a crosshead speed of 5 inch/minute in accordance with ASTM D-1708.

Hardness

Measure Shore A hardness with a CHECKLINE digital multi-scale durometer in accordance with ASTM D-2240. The durometer employed for the measurements has a model # RX-DD-MS.

Synthesis of Epoxy-Terminated Prepolymer

Prepare the epoxy-terminated prepolymer of the present disclosure as follows. Charge 180.000 grams (g) of D.E.R.383 (epoxy monomer, equivalent weight 180) into a 500 milliliter (mL) four-neck round bottom flask (flask) having a dripping funnel, a mechanical stirrer, a heater and a wire thermocouple. Charge 190.400 g of JEFFAMINE® T-5000 (amine terminated polymeric polyol, equivalent weight 952.0000) into the dripping funnel. Heat the content of the flask to 115° C. under nitrogen atmosphere. Add the JEFFAMINE® T-5000 drop wise over 1 hour to the contents of the flask with stirring. After adding the JEFFAMINE® T-5000 hold the contents of the flask at 115° C. under nitrogen atmosphere for 4 hours. The molar ratio of the epoxy groups in the epoxy monomer to the amine groups in the amine terminated polymeric polyol is 5:1.

Take and analyze a sample of the contents of the round bottom flask for epoxy equivalent weight (EEW) every hour over the 4 hours or until the EEW reaches its calculated EEW value of 460 g/mol. Cool the contents of the flask to 80° C. and discharged the epoxy-terminated prepolymer into a glass jar.

Comparative Example A

CompEx A

Prepare CompEx A as follows. Mix 100 g of the epoxy-terminated prepolymer (prepared above), heated to 60° C., with 6.64 g MEA (AEW is 30.5 g/mol) and 0 g of zinc octoate in a FlackTek SpeedMixer™ for 30 seconds at 800 rpm followed by one minute at 2350 rpm.

The molar ratio of epoxy-terminated prepolymer and the MEA is 1:1. Pour the resulting mixture into a mold having a 6.5"×6.5"×0.05" square window spacer positioned between two Duofoil aluminum sheets supported with outer steel plates. Place the filled mold in an oven and cure at 100° C. for 1 hours. Demold the cured epoxy elastomer composition plaque.

Example 1 (Ex 1)—Epoxy Elastomer Composition

For Ex 1, repeat the procedure for CompEx A, except mix 100 g of the epoxy-terminated prepolymer, heated to 60° C., with 6.64 g MEA and 2.0 g of zinc octoate (1.84 weight percent relative the epoxy composite) in the FlackTek SpeedMixer™ for 30 seconds at 800 rpm followed by one minute at 2350 rpm.

Ex 2

Repeat the procedure for CompEx A, except mix 100 g of the epoxy-terminated prepolymer, heated to 60° C., with 6.64 g MEA and 4.0 g of zinc octoate (3.62 weight percent relative the epoxy composite) in the FlackTek SpeedMixer™ for 30 seconds at 800 rpm followed by one minute at 2350 rpm.

CompEx B

Repeat the procedure for CompEx A, except mix 100 g of the epoxy-terminated prepolymer, heated to 60° C., with 6.64 g MEA and 2.0 g of bismuth octoate (1.84 weight percent relative the epoxy composite) in the FlackTek SpeedMixer™ for 30 seconds at 800 rpm followed by one minute at 2350 rpm.

CompEx C

Repeat the procedure for CompEx A, except mix 100 g of the epoxy-terminated prepolymer, heated to 60° C., with 6.64 g MEA and 2.0 g of Ti(O-iPr)$_4$ (1.84 weight percent relative the epoxy composite) in the FlackTek SpeedMixer™ for 30 seconds at 800 rpm followed by one minute at 2350 rpm.

Ex 3

Repeat the procedure for CompEx A, except mix 100 g of the epoxy-terminated prepolymer, heated to 60° C., with 6.64 g MEA and 4.0 g of bismuth neodecanoate (3.62 weight percent relative the epoxy composite) in the FlackTek SpeedMixer™ for 30 seconds at 800 rpm followed by one minute at 2350 rpm.

Ex 4

Repeat the procedure for CompEx A, except mix 100 g of the epoxy-terminated prepolymer, heated to 60° C., with 6.64 g MEA and 8.0 g of bismuth neodecanoate (6.98 weight percent relative the epoxy composite) in the FlackTek SpeedMixer™ for 30 seconds at 800 rpm followed by one minute at 2350 rpm.

Ex 5

Repeat the procedure for CompEx A, except mix 100 g of the epoxy-terminated prepolymer, heated to 60° C., with 6.64 g MEA and 10.0 g of bismuth neodecanoate (8.57 weight percent relative the epoxy composite) in the FlackTek SpeedMixer™ for 30 seconds at 800 rpm followed by one minute at 2350 rpm.

Ex 6

Repeat the procedure for CompEx A, except mix 100 g of the epoxy-terminated prepolymer, heated to 60° C., with 6.64 g MEA and 4.0 g of titanium(IV) 2-ethylhexyloxide (3.62 weight percent relative the epoxy composite) in the FlackTek SpeedMixer™ for 30 seconds at 800 rpm followed by one minute at 2350 rpm.

Ex 7

Repeat the procedure for CompEx A, except mix 100 g of the epoxy-terminated prepolymer, heated to 60° C., with 6.64 g MEA and 8.0 g of titanium(IV) 2-ethylhexyloxide (6.98 weight percent relative the epoxy composite) in the FlackTek SpeedMixer™ for 30 seconds at 800 rpm followed by one minute at 2350 rpm.

Ex 8

Repeat the procedure for CompEx A, except mix 100 g of the epoxy-terminated prepolymer, heated to 60° C., with 6.64 g MEA and 10.0 g of titanium(IV) 2-ethylhexyloxide (8.57 weight percent relative the epoxy composite) in the FlackTek SpeedMixer™ for 30 seconds at 800 rpm followed by one minute at 2350 rpm.

CompEx D

Repeat the procedure for CompEx A, except mix 100 g of the epoxy-terminated prepolymer, heated to 60° C., with 6.64 g MEA and 4.0 g of aluminum acetoacetate (3.62 weight percent relative the epoxy composite) in the FlackTek SpeedMixer™ for 30 seconds at 800 rpm followed by one minute at 2350 rpm.

CompEx E

Repeat the procedure for CompEx A, except mix 100 g of the epoxy-terminated prepolymer, heated to 60° C., with 6.64 g MEA and 4.0 g of zinc stearate (3.62 weight percent relative the epoxy composite) in the FlackTek SpeedMixer™ for 30 seconds at 800 rpm followed by one minute at 2350 rpm.

CompEx F

Repeat the procedure for CompEx A, except mix 100 g of the epoxy-terminated prepolymer, heated to 60° C., with 6.64 g MEA and 4.0 g of zirconium acetylacetonate (3.62 weight percent relative the epoxy composite) in the Flack-Tek SpeedMixer™ for 30 seconds at 800 rpm followed by one minute at 2350 rpm.

CompEx G

Repeat the procedure for CompEx A, except mix 100 g of the epoxy-terminated prepolymer, heated to 60° C., with 6.64 g MEA and 10.0 g of tin(II) 2-ethylhexanoate (8.57 weight percent relative the epoxy composite) in the Flack-Tek SpeedMixer™ for 30 seconds at 800 rpm followed by one minute at 2350 rpm.

CompEx H

Repeat the procedure for CompEx A, except mix 100 g of the epoxy-terminated prepolymer, heated to 60° C., with 6.64 g MEA and 10.0 g of cobalt (II) 2-ethylhexanoate 65% in mineral spirits (8.57 weight percent relative the epoxy composite) in the FlackTek SpeedMixer™ for 30 seconds at 800 rpm followed by one minute at 2350 rpm.

CompEx I

Repeat the procedure for CompEx A, except mix 100 g of the epoxy-terminated prepolymer, heated to 60° C., with 6.64 g MBA and 4.0 g of cobalt (II) 2-ethylhexanoate 65% in mineral spirits (3.62 weight percent relative the epoxy composite) in the FlackTek SpeedMixer™ for 30 seconds at 800 rpm followed by one minute at 2350 rpm.

Performance Results
Dynamic Mechanical Analysis (DMA)

Table 1 summaries the tensile properties and hardness of Ex 1 through Ex 8 and CompEx A through CompEx I of the epoxy elastomer composition. Compared with CompEx A, cured epoxy elastomer composition plaques with zinc octoate additive (Ex 1 and Ex 2) showed increased properties in elongation, Young's Modulus, tensile strength and hardness. Furthermore, higher loading of zinc octoate led to higher incremental changes in tensile properties. The similar trends are observed with other organometallic additives as well such as bismuth neodecanoate (Ex 3 to Ex 5) and titanium(IV) 2-ethylhexyloxide (Ex 6 to Ex 8).

TABLE 1

| Example | Elongation (%) | Young's Modulus (MPa) | Tensile Strength (MPa) | Hardness (Shore A) |
|---|---|---|---|---|
| CompEx A | 143 | 7.1 | 8.3 | 78 |
| Ex 1 | 160 | 13.8 | 11.4 | 83 |
| Ex 2 | 214 | 35.6 | 13.3 | 91 |
| CompEx B | 124 | 4.7 | 4.2 | N.D. |
| CompEx C | 106 | 8.6 | 8.0 | N.D. |
| Ex 3 | 224 | 19.5 | 11.5 | 84 |
| Ex 4 | 273 | 52.8 | 12.6 | 88 |
| Ex 5 | 360 | 69.4 | 13.6 | 87 |
| Ex 6 | 159 | 8.5 | 10.2 | 82 |
| Ex 7 | 135 | 12.4 | 10.9 | 85 |
| Ex 8 | 130 | 24.9 | 13.9 | 89 |
| CompEx D | 134 | 4.6 | 3.9 | N.D. |
| CompEx E | 128 | 27.5 | 6.3 | N.D. |
| CompEx F | 155 | 5.4 | 3.1 | N.D. |
| CompEx G | 81 | 7.4 | 3.8 | 77 |
| CompEx H | 127 | 8.7 | 6.0 | 78 |
| CompEx I | 165 | 11.0 | 7.6 | N.D. |

Figure 1B:
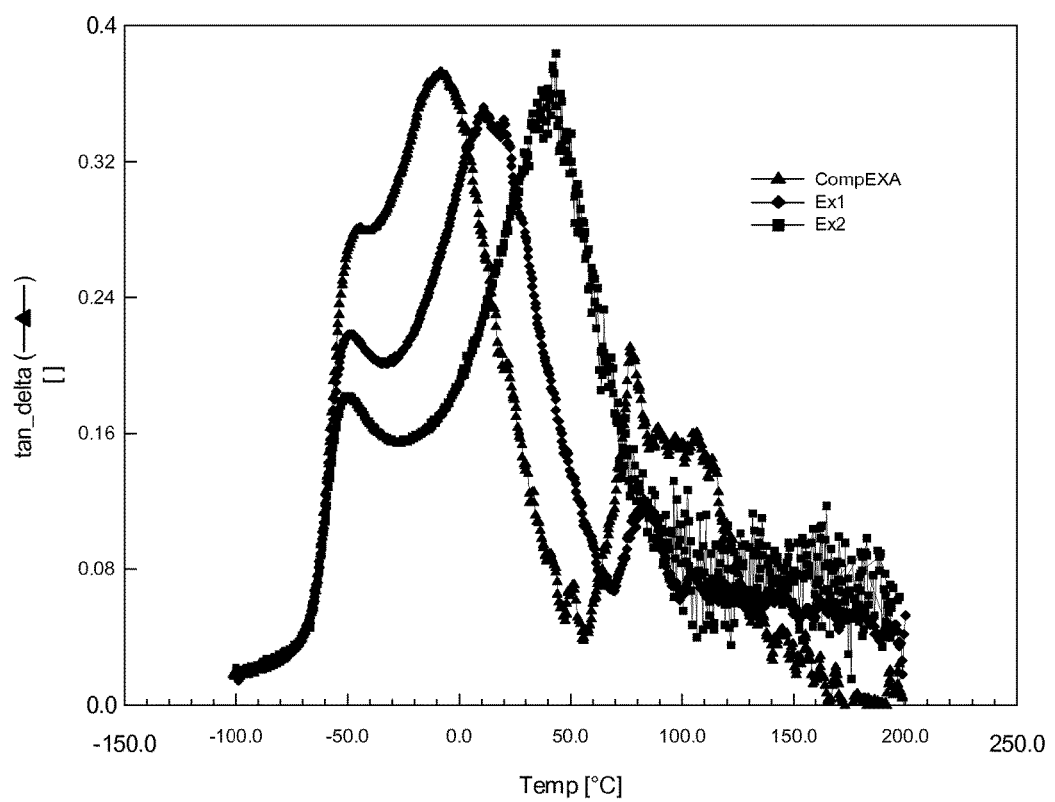
Figure 2A:
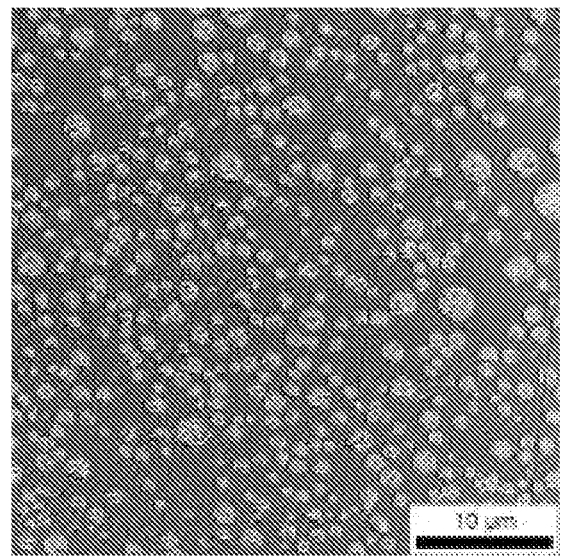
FIGS. 2A and 2B provide atomic force microscope (AFM) phase images that demonstrate the transformation of the epoxy hard segments from micrometer scale domains to nanometer scale domains according to the present disclosure.
Figure 2B:
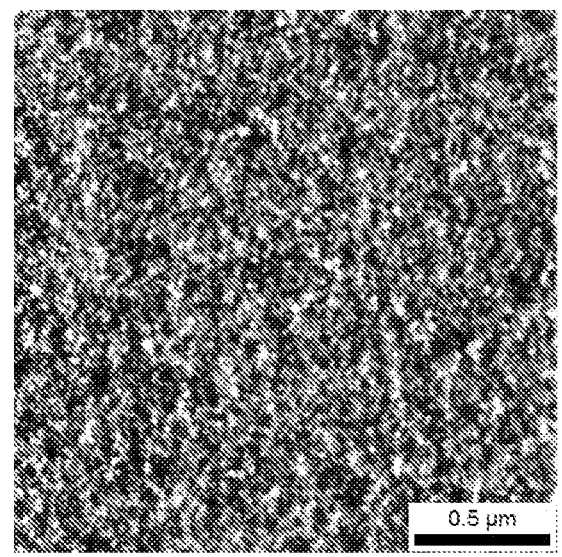

FIGS. 1A and 1B show the dynamic mechanical analysis (DMA) of CompEx A, Ex 1 and Ex 2 of the epoxy elastomer composition of the present disclosure. FIG. 1B shows that the addition of zinc octoate in both Ex 1 and Ex 2 causes the disappearance of tan δ peak at 80° C. seen in CompEx A, and shifted the middle tan δ at −9° C. to higher temperature at 44° C. In addition, the epoxy elastomer composition plaques became more transparent which also suggested nanometer scale phase separation. The AFM micrographs in FIGS. 2A and 2B demonstrate the transformation of the epoxy hard segments from micrometer scale domains to nanometer scale domains. A shift of the second $T_g$ to above room temperature (23° C.) lead to higher modulus at room temperature as supported by FIG. 1A which shows both elastic and loss moduli progressively increase with the higher loading of zinc octoate. The trend is consistent with the tensile data. The collective data of tensile and DMA test showed that addition of zinc octoate is an effective method to promote nanometer scale separation of the hard segments.

Table 1 also lists tensile data of CompEx A and Ex 1 and Ex 3 through 5 (cured epoxy elastomer composition plaque cured with MEA at different loading of bismuth neodecanoate). Compared with Ex 1, cured epoxy elastomer composition plaques with bismuth neodecanoate additive showed increased properties in elongation, Young's Modulus and tensile strength. Furthermore, higher loading of bismuth neodecanoate led to higher incremental changes in tensile properties. It is believed that the property enhancement can be explained by phase transition from micrometer scale to nanometer scale phase separation as discussed herein.

Table 1 further lists the tensile data of CompEx A and Ex 6 through 8 (cured epoxy elastomer composition plaque cured with MEA at different loading of titanium(IV) 2-ethylhexyloxide). Compared with CompEx A, cured epoxy elastomer composition plaques with titanium(IV) 2-ethylhexyloxide additive showed increased properties in Young's Modulus and tensile strength. Furthermore, higher loading of titanium(IV) 2-ethylhexyloxide led to higher incremental changes in tensile properties. It is believed that the property enhancement can be explained by phase transition from micrometer scale to nanometer scale phase separation as discussed herein.

What is claimed:
1. An epoxy composition, comprising:
an epoxy-terminated prepolymer formed from a reaction product of an amine terminated polymeric polyol and a molar excess of epoxy groups in an epoxy monomer relative to a molar amount of amine groups in the amine terminated polymeric polyol;
an alkanolamine hardener having at least one hydroxyl group; and
1.0 to 10 weight percent (wt. %) of an organometallic compound relative the total weight of the epoxy composition, where the organometallic compound is selected from the group consisting of bismuth neodecanoate, titanium(IV) 2-ethylhexyloxide, and a combination thereof, and where amine groups of the alkanolamine hardener react with epoxy groups of the epoxy-terminated prepolymer in a stoichiometric ratio to form a cured epoxy composition.

2. The epoxy composition of claim 1, where the alkanolamine hardener is monoethanolamine.

3. The epoxy composition of claim 1, where the amine terminated polymeric polyol is a primary or secondary amine terminated polyether polyol.

4. The epoxy composition of claim 1, where the amine terminated polymeric polyol is an amine terminated polyester polyol.

5. The epoxy composition of claim 1, where the amine terminated polymeric polyol is an amine terminated butadiene acrylonitrile.

6. A method of forming a cured epoxy composition, comprising:
admixing an epoxy-terminated prepolymer formed from a reaction product of an amine terminated polymeric polyol and a molar excess of epoxy groups in an epoxy monomer, relative to a molar amount of amine groups in the amine terminated polymeric polyol; an alkanolamine hardener, and 1.0 to 10 wt. % of an organometallic compound relative the total weight of the cured epoxy composition to form an epoxy composition, where the organometallic compound is selected from the group consisting of bismuth neodecanoate, titanium(IV) 2-ethylhexyloxide, and a combination thereof, and where amine groups of the alkanolamine hardener react with epoxy groups of the epoxy-terminated prepolymer in a stoichiometric ratio in the epoxy composition to form the cured epoxy composition.

7. The method of claim 6, where the alkanolamine hardener has a primary hydroxyl group.

8. The method of claim 6, where the alkanolamine hardener has a secondary hydroxyl group.

9. The method of claim 6, where reacting the epoxy-terminated prepolymer with the alkanolamine hardener and the organometallic compound includes forming a nanometer scale separated morphology of hard segments formed with the alkanolamine hardener and the epoxy monomer in a soft matrix, relative the hard segments, formed with a backbone of the epoxy-terminated prepolymer.

* * * * *